July 1, 1969 T. D. LODE 3,453,627
RADIO DIRECTION MEASUREMENT SYSTEM AND METHOD
Filed July 24, 1967
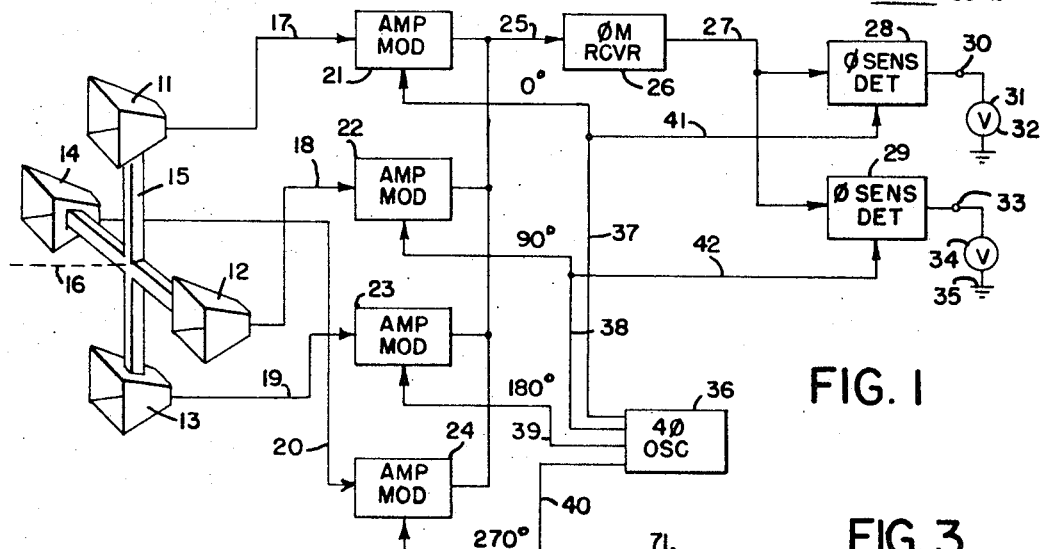
FIG. 1
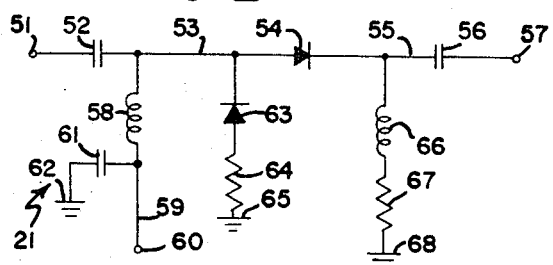
FIG. 2
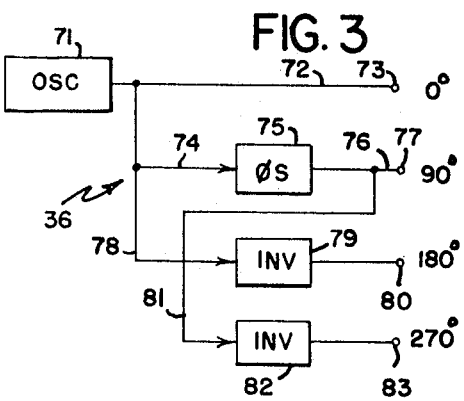
FIG. 3
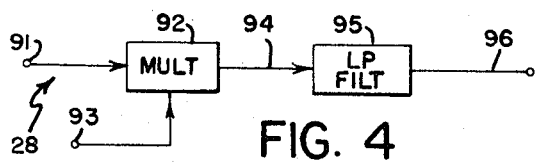
FIG. 4
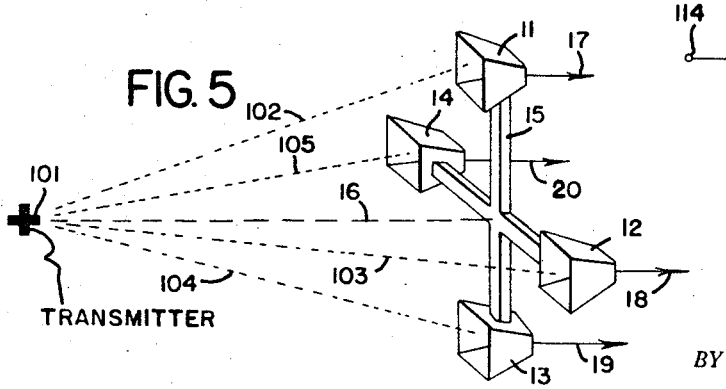
FIG. 5
FIG. 9
INVENTOR.
TENNY D. LODE
BY
Dugger, Peterson, Johnson & Westman
ATTORNEYS July 1, 1969     T. D. LODE     3,453,627

RADIO DIRECTION MEASUREMENT SYSTEM AND METHOD

Filed July 24, 1967     Sheet 2 of 2

INVENTOR
TENNY D. LODE
BY
Dugger, Peterson, Johnson & Westman
ATTORNEYS

United States Patent Office 3,453,627,
Patented July 1, 1969

3,453,627
RADIO DIRECTION MEASUREMENT
SYSTEM AND METHOD
Tenny D. Lode, Madison, Wis., assignor to Rosemount Engineering Company, Minneapolis, Minn., a corporation of Minnesota
Continuation-in-part of application Ser. No. 424,906, Jan. 12, 1965. This application July 24, 1967, Ser. No. 655,660
Int. Cl. G01s 5/04
U.S. Cl. 343—121
9 Claims

ABSTRACT OF THE DISCLOSURE

This disclosure shows means for measuring the direction of a radio signal source in two independent angular coordinates with a single radio receiver. In one form, four receiving antennas are arranged at the vertices of a square and connected through four amplitude modulators to the input of a common phase modulation receiver. The four modulators are driven by a four-phase oscillator with four phases of a sine wave successively 90° apart. The result is that the combined signal at the input to the receiver will in general have a phase modulation at the frequency of the four-phase oscillator. The magnitude and phase of the output of the phase modulation receiver, or the magnitudes of sine and cosine components thereof, indicate the direction of the signal source in two angular coordinates.

Cross-reference to related application

This application is a continuation-in-part of a copending application for Radio Direction Measurement, filed Jan. 12, 1965, Ser. No. 424,906 now abandoned.

Background of the invention

This invention is in the field of the measurement of the directions from which wave signals are received. More particularly, it relates to the measurement of two angular coordinates of the direction of a radio signal source, such as azimuth and elevation, with a single radio receiver.

It is frequently desirable to measure the direction from which a radio signal is received. For example, the measurement of the direction of a transmitted or reflected radio signal from an aircraft or space vehicle is a convenient way of measuring the angular position of the aircraft or space vehicle.

Radio direction measurement systems have been known and used for several decades. If two angular coordinates are to be measured, it has been a common practice to use two substantially separate measurement systems each measuring one coordinate. This results in the overall system being more complex than would be desired and may require that several radio receivers be tuned together so as to be receiving substantially the same signal.

Summary of the invention

An object of the present invention is to allow the measurement of two angular coordinates of the direction of a radio signal source with relatively simple equipment.

In one form of the present invention, three or more antennas in a non-colinear array are employed to acquire the signal whose direction is to be measured. Each antenna is connected to an associated amplitude modulator, and the outputs of the modulators are combined into a single composite signal. Each modulator is driven by a different phase of a polyphase modulation signal source. The result is that the combined signal will in general have a phase modulation at the polyphase source frequency. A single phase modulation receiver is used to select, amplify and phase demodulate the combined signal for the measurement of the two angular coordinates of the source.

Brief description of the drawings

FIGURE 1 is a block diagram illustrating a first form of the invention;

FIGURE 2 is a schematic illustration exemplifying one of the amplitude modulators of FIGURE 1;

FIGURE 3 is a diagram presenting the components of the four-phase oscillators of FIGURE 1 in block form;

FIGURE 4 is a block diagram showing one form the phase sensitive detectors of FIGURE 1 may assume;

FIGURE 5 is an illustration of a first case to be analyzed in which a distant transmitter is located on the center line of the receiving antenna array;

FIGURE 9 is a block diagram representing an alternate form of phase and amplitude measurement circuit which may be substituted for the phase sensitive detectors and voltmeters of FIGURE 1.

Description of the preferred embodiment

Figure 6:
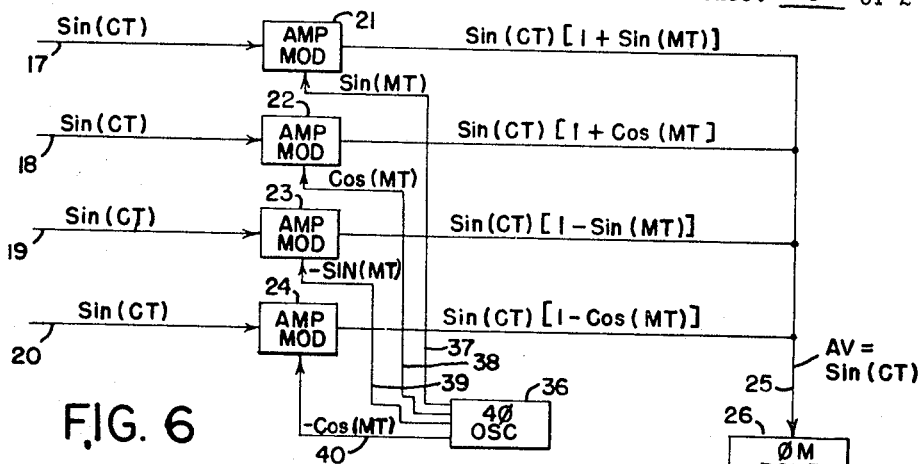
FIGURE 6 is a block diagram corresponding to a portion of FIGURE 1 and illustrating the signals which will be present at certain points within the system for the case depicted in FIGURE 5.

In FIGURE 1, receiving antennas 11, 12, 13 and 14 are mounted on a cross support 15, spaced equally distant from a center line denoted by the reference numeral 16. As clearly appears, antenna 11 is above the center line 16, antenna 13 below the center line and antennas 12 and 14 to either side so that the center line 16 is a symmetry axis for the antenna array. Antennas 11, 12, 13 and 14 are connected via lines 17, 18, 19 and 20 to a first input of each of amplitude modulators 21, 22, 23 and 24, respectively. The outputs of modulators 21, 22, 23 and 24 are mixed and connected in common via line 25 to the input of an angle modulation receiver 26. The output of the angle modulation receiver 26 is connected via line 27 to a first input of each of a pair of phase sensitive detectors 28 and 29. The output of the phase sensitive detector 28 is connected to output terminal 30 and to a first side of a voltmeter 31. The second side of voltmeter 31 is connected to ground at 32. The output of phase sensitive detector 29 is connected to output terminal 33 and to a first side of a voltmeter 34. The second side of voltmeter 34 is connected to ground at 35. Four-phase oscillator 36 has outputs of 0°, 90°, 180° and 270° relative phase which are connected via lines 37, 38, 39 and 40 to the second inputs of modulators 21, 22, 23 and 24, respectively. The 0° output of oscillator 36 is also connected via line 41 to the second input of the phase sensitive detector 28, and the 90° output of the oscillator 36 is connected via line 42 to the second input of the phase sensitive detector 29.

FIGURE 2 is a schematic illustration of one of the amplitude modulators 21, 22, 23 and 24 of FIGURE 1, the particular modulator being labeled 21. In FIGURE 2, carrier signal input terminal 51 is connected via capacitor 52 to line 53. Line 53 connects to the anode of diode 54. The cathode of diode 54 is connected via line 55 and capacitor 56 to output terminal 57. Inductor 58 connects from line 53 to line 59 and modulating signal input terminal 60. Capacitor 61 connects from line 59 to ground 62. The cathode of diode 63 is connected to line 53, and its anode is connected through resistor 64 to ground 65. The series combination of inductor 66 and resistor 67 connects from line 55 to ground 68.

When the circuit of FIGURE 2 is used as the modulator 21 of FIGURE 1, it will be understood that line 17 is connected to input terminal 51 and that line 37 is connected to input terminal 60 and that output terminal 57 is connected to line 25. Similar connections are of course made when the circuit of FIGURE 2 is repeated for the amplitude modulators 22, 23 and 24. The carrier wave signal applied to input terminal 51 will in general be of higher frequency and smaller amplitude than the modulation signal applied to input terminal 60.

When a positive voltage is applied to terminal 60, diode 54 will conduct and be in a low impedance state, while diode 63 will be in a substantially nonconducting, high impedance state. Signals applied to input terminal 51 will then be coupled with little loss to the output terminal 57. When a negative voltage is applied to input terminal 60, diode 54 will be in a substantially nonconducting, high impedance state, while diode 63 will be in a conducting, low impedance state. The high impedance of diode 54 will reduce the coupling between input terminal 51 and output terminal 57. The low impedance of diode 63 will effectively connect resistor 64 between line 53 and ground 65 so that carrier signal energy applied to input terminal 51 will be dissipated in resistor 64. As the voltage on terminal 60 varies through a range of positive and negative values, signal energy on terminal 51 will be coupled to output terminal 57 to a greater or lesser extent. Thus, the output signal on terminal 57 will correspond to the signal applied to input terminal 51, amplitude modulated in accordance with the signal applied to input terminal 60.

The values of capacitors 52, 56 and 61 are chosen so as to substantially pass carrier frequency signals while substantially blocking modulation frequency signals. The values of inductors 58 and 66 are chosen so as to substantially pass modulation frequency signals while substantially blocking carrier frequency signals.

In analyzing the operation of the invention, the carrier frequency signal applied to terminal 51 may be expressed in a form such as $\sin(CT)$ where C is the carrier frequency in radians per second and T is the time in seconds. Similarly, the modulation frequency signal applied to terminal 60 may be expressed in a form such as $\sin(MT)$ where M is the modulation frequency in radians per second. The output signal component on terminal 57 may then be expressed as $\sin(CT)(1+\sin(MT))$. If the phases of the input carrier frequency and/or modulation frequency signals are changed, the output signal component will be changed accordingly.

FIGURE 3 is a block diagram showing the components typically constituting the four-phase oscillator 36 of FIGURE 1. In FIGURE 3, the output of a conventional single-phase oscillator 71 is connected via line 72 to output terminal 73. The signal on line 72 is also connected via line 74 to the input of 90° phase shift network 75. The output of network 75 is connected via line 76 to output terminal 77. The signal on line 72 is also connected via line 78 to the input of inverter 79. The output of inverter 79 is connected to output terminal 80. The signal on line 76 is connected via line 81 to the input of inverter 82, whose output is connected to output terminal 83. As indicated in FIGURE 3, terminals 73, 77, 80 and 83 are 0°, 90°, 180° and 270° relative phase outputs. In embodying the circuit of FIGURE 3, which constitute the oscillator 36, in FIGURE 1, terminals 73, 77, 80 and 83 are connected to lines 37, 38, 39 and 40, respectively.

As mentioned above, the oscillator 71 is a conventional single-phase oscillator and therefore provides a first signal, arbitrarily designaed as 0° relative phase, on output terminal 73. Phase shift network 75 generates an output whose relative phase differs by 90° from its input. Such phase shift networks are well known and are described in many standard engineering references. Inverters 79 and 82 generate output signals which are of the same magnitude but opposite polarity relative to their input signals. Inverter 79 inverts the phase of the 0° signal on line 78 into a 180° signal, and inverter 82 inverts the 90° signal on line 81 into a 270° signal. Other forms of polyphase oscillators are known and may be used with this invention.

In subsequent analysis, the output signals on terminals 73, 77, 80 and 83 will be expressed as $\sin(MT)$, $\cos(MT)$, $-\sin(MT)$ and $-\cos(MT)$, respectively.

FIGURE 4 is a block diagram showing one of the phase sensitive detectors 28 and 29 of FIGURE 1, the one appearing having been given the reference numeral 28. In this figure, input terminal 91 is connected to a first input of a multiplier 92. Input terminal 93 is connected to the second input of the multiplier 92. The output of multiplier 92 is connected via line 94 to the input of a low pass filter 95 whose output is connected to output terminal 96.

In normal use, a signal to be analyzed is applied to one input terminal of the multiplier 92, such as terminal 91, and a reference signal is applied to the other input terminal, such as terminal 93. The output on terminal 96 is then a measure of the average magnitude of that part of the input signal applied to terminal 91 which is of the same frequency and phase as the reference signal applied to terminal 93. For example, a signal of the form $[X \sin(MT) + Y \cos(MT)]$ may be applied to terminal 91, and a reference signal $\sin(MT)$ may be applied to input terminal 93. The multiplier output signal on line 94 will then be $[X \sin^2(MT) + Y \sin(MT) \cos(MT)]$. Low pass filter 95 will reject the alternating $[Y \sin(MT) \cos(MT)]$ component and pass only the average value of $[X \sin^2(MT)]$ which is $X/2$. Hence, if a signal containing modulation frequency components of several phases is applied to input terminal 91, and a reference signal of a particular phase is applied to input terminal 93, the output on terminal 96 will indicate the magnitude of the component of the signal on terminal 91 which is in phase with the reference signal on terminal 93.

As hereinbefore indicated, the circuit of FIGURE 4 constitutes the phase sensitive detector 28 of FIGURE 1 and the output signal at terminal 30 of FIGURE 1 (terminal 96 of FIGURE 4) will indicate the magnitude of the 0° or sine phase component of the signal on line 27, and the output on terminal 33 (the phase sensitive detector 29 being a duplicate of the detector 28) will indicate the magnitude of the 90° or cosine phase component in the signal on line 27.

Angle modulation receiver 26 may be considered as a frequency modulation receiver or as a phase modulation receiver. As will be shown, the input signal to receiver 26 on line 25 is in general angle modulated at the frequency of oscillator 36. Since frequency is a time rate of change of phase, and phase is a time integral of frequency, this angle modulation is both a frequency modulation and a phase modulation. Hence, the angle modulation may be detected as a frequency modulation, a phase modulation or other form of angle modulation as desired. In subsequent analysis, it will be assumed that angle modulation receiver 26 is a phase modulation receiver. An input signal on line 25 of the form $\sin(CT+P)$ will generate an output signal proportional to P on line 27, where P is a short term phase deviation angle.

In analyzing the operation of the system of FIGURE 1, the case of signals received from a distant transmitter which is located on center line 16 will first be considered. The geometry of this case is illustrated in FIGURE 5. The corresponding signals at various points of the system of FIGURE 1 are indicated in FIGURE 6. In FIGURE 5, transmitter 101 is located on center line 16, the axis of symmetry of the antenna array. Hence, paths 102, 103, 104, 105 between the transmitter 101 and antennas 11, 12, 13 and 14 are of substantially equal lengths. Because of the equal lengths, carrier wave signals transmitted by transmitter 101 will be received by antennas 11, 12, 13 and 14 at substantially the same phase. Hence, the signals on lines 17, 18, 19 and 20 may all be written as sin (CT).

As shown, the contribution of amplitude modulator 21 to the composite signal on line 25 will be sin (CT) [1+sin (MT)]. The contributions of amplitude modulators 2, 23 and 24 will be sin (CT)[1+cos (MT)], sin (CT)[1−sin (MT)] and sin (CT) [1−cos (MT)]. When the four output contributions of amplitude modulators 21, 22, 23 and 24 are averaged, the result is simply sin (CT). Since the composite signal on line 25 is a simple carrier wave signal with substantially no phase modulation, the output of angle modulation receiver 26 on line 27 will be substantially zero. The outputs of phase sensitive detectors 28 and 29 and the reading of voltmeters 31 and 34 will also be zero. These zero outputs, in the presence of a received signal, will indicate that transmitter 101 is on center line 16.

Figure 7:
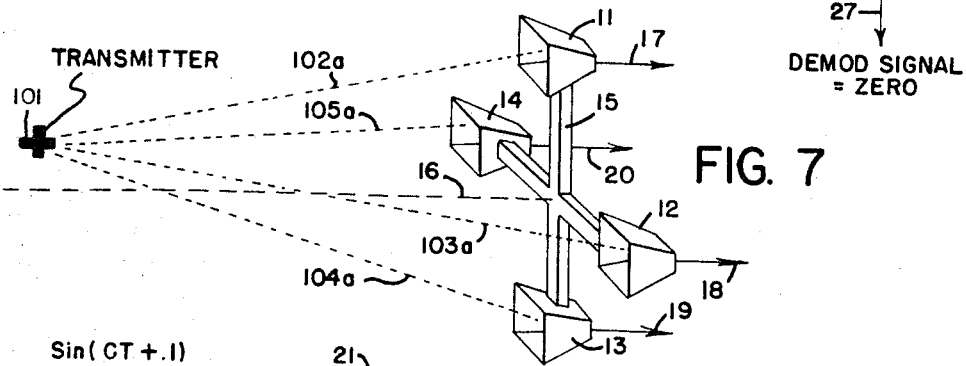
FIGURE 7 is an illustration similar to FIGURE 5 but representing a second case to be analyzed in which a distant transmitter is located above the center line.
Figure 8:
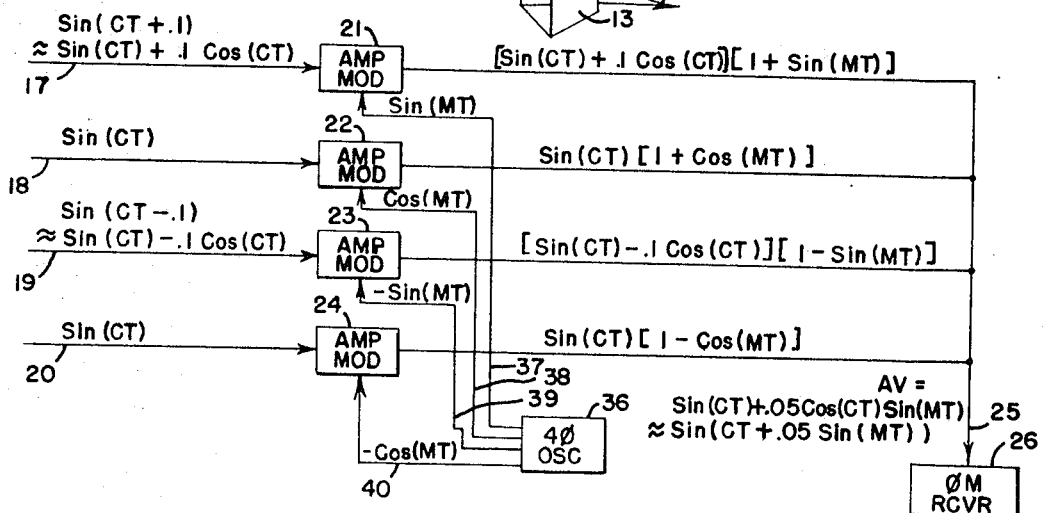
FIGURE 8 is a block diagram corresponding to that of FIGURE 6 but instead illustrating the signals which will be present at various points within the system for the case depicted in FIGURE 7.

Next we consider the case illustrated in FIGURES 7 and 8 in which the transmitter 101 is above center line 16. Paths 103a and 105a will be of substantially equal length. Path 102a will be shorter than paths 103a and 105a and path 104a will be longer than paths 103a and 105a. These differences in path lengths will cause the carrier wave signals from the transmitter 101 to be received at antennas 11, 12, 13 and 14 at different relative phases. The signal received by antenna 11 will have an earlier relative phase, the signal received by antenna 13 will have a later relative phase, and the signals received by antennas 12 and 14 will have an intermediate relative phase. If the distance from center line 16 to each of the antennas is one wavelength, and transmitter 101 is 0.9° above center line 16, the phase shifts of the signals received at antennas 11 and 13 will be approximately 0.1 radians relative to the phases of the signals received at antennas 12 and 14. Hence, we may write the signals on lines 17, 18, 19 and 20 as sin (CT+.1), sin (CT), sin (CT−.1) and sin (CT).

From trigonometry, if B is a small angle, then [sin (A+B)] may approximated by [sin (A)+B cos (A)]. Hence, we may also express the signals appearing on lines 17 and 19 as [sin (CT)+.1 cos (CT)] and [sin (CT)−.1 cos (CT)].

After passing through the amplitude modulators 21, 22, 23 and 24, the four individual signal components will be as indicated in FIGURE 8 on the lines between amplitude modulators 21, 22, 23 and 24 and line 25. When these four signals are algebraically averaged, the result is a composite signal of the form sin [CT+.05 sin (MT)]. This composite signal does have a phase modulation so that the output of angle modulation receiver 26 on line 27 will be .05 sin (MT).

From the previously explained operation of phase sensitive detectors 28 and 29, it will be appreciated that phase sensitive detector 28 will respond to the sine component signal on line 27 and generate an output on terminal 30 of .025. The output of phase sensitive detector 29 on terminal 33 will be substantially zero. The positive signal on terminal 30 as read by voltmeter 31 will indicate that the transmitter 101 is above center line 16, as it appears in FIGURE 7. With the dimensions and units given, the proportionality factor will be approximately .028 output units for each angular degree that transmitter 101 is above center line 16. A negative output on terminal 30 will indicate that the transmitter 101 is below center line 16. Positive or negative outputs on terminal 33 will indicate that the transmitter 101 is to the left or right of center line 16. Thus, the outputs on terminals 30 and 33 provide an indication of the azimuth and elevation bearing angles of transmitter 101 relative to center line 16.

FIGURE 9 is a block diagram of an alternate form of phase and amplitude measurement circuit which may be substituted for phase sensitive detectors 28 and 29 and voltmeters 31 and 34 of FIGURE 1. In FIGURE 9, input terminal 111 connects to the input of an AC voltmeter 112 and to a first input of a phase meter 113. Input terminal 114 connects to the second input of phase meter 113. AC voltmeter 112 measures the amplitude of the modulation frequency signal component applied to terminal 111. Phase meter 113 measures the phase of the modulation frequency component on terminal 111 relative to a reference signal applied to terminal 114.

When the circuit of FIGURE 9 is substituted for the previously described phase sensitive detectors 28 and 29 and volmeters 31 and 34 of FIGURE 1, terminal 111 would be connected to line 27 and terminal 114 to line 41. The readings of AC voltmeter 112 and phase meter 113 may be viewed as a polar coordinate form of presentation in contrast to the rectangular coordinate presentation of voltmeters 31 and 34 for small angular deviations of transmitter 101 from center line 16. If transmitter 101 is located along center line 16, the reading of AC voltmeter 112 will be substantially zero indicating that fact.

AC voltmeter 112 may be calibrated to read in arbitrary voltage units or may be calibrated directly in terms of degrees or other angular units separating transmitter 101 and center line 16. If transmitter 101 is 1° above center line 16, the reading of AC voltmeter 112 will indicate this 1° angle. As explained earlier, the phase of the modulation frequency signal on line 27 will then be substantially the same as that on line 41. Hence, phase meter 113 will indicate that the relative phase of the modulation frequency signal on terminal 111 is zero indicating that transmitter 101 is above center line 16. If transmitter 101 is 1° above center line 16 and 1° to the left of center line 16, voltmeter 31 and 34 of FIGURE 1 would each indicate a 1° deviation. AC voltmeter 112 of FIGURE 9 would indicate an approximately 1.4° deviation, the vector sum of two 1° deviations at right angles. Phase meter 113 would measure a 45° relative phase indicating that the direction of the deviation of transmitter 101 from center line 16 was 45° from the vertical.

The drawings have illustrated a system in which an angle modulation receiver 26 is connected to a symmetric arrangement of four receiving antennas 11, 12, 13 and 14 through four amplitude modulators 21, 22, 23 and 24. Other circuit and/or geometric configurations, however, may be used within the spirit of this invention. For example, a system of three antennas located at 120° intervals around circumference of a circle could be used with three amplitude modulators and a three-phase oscillator providing 0°, 120° and 240° relative phase outputs; still other symmetric and nonsymmetric antenna arrangements may also be employed.

The operation of the system of FIGURE 1 has been described for cases in which a transmitter is located relatively close to an axis of symmetry of the antenna array. The invention may also be used in substantially similar manner to measure the angular positions of transmitters whose directions are relatively far from an axis of symmetry of an antenna array, or with antenna arrays which do not have simple symmetry axes.

The invention has been described in terms of the measurement of the direction of an electromagnetic wave signal. With suitable transducers substituted for the electromagnetic wave antennas, substantially the same methods and systems may be used for the measurement of the direction of a sound wave in water or other types of waves as desired.

I claim:

1. A system for measuring the direction from which a wave signal is received relative to two independent angular coordinates including at least three wave receiving means arranged generally about a reference axis, polyphase modulation means for modulating the signal from at least three of the wave receiving means with a separate and known phase, means for combining the modulated signals into a single combined signal, angle modulation receiver means for receiving and demodulating the angle modulation of the combined signal, and means for measuring two independent parameters of the output of the angle modulation receiver means.

2. The system of claim 1 further characterized by the wave signal being an electromagnetic wave signal, and by the wave receiving means being electromagnetic wave receiving means.

3. The system of claim 2 further characterized by said means for measuring two independent parameters of the output of the angle modulation receiver means comprising means for measuring the amplitudes of two independent phase components of the receiver output signal relative to the polyphase modulation.

4. The system of claim 2 further characterized by said means for measuring two independent parameters of the output of the angle modulation receiver means comprising means for measuring the amplitude and phase of the receiver output signal relative to the polyphase modulation.

5. The system of claim 2 further characterized by the electromagnetic wave receiving means being four in number and arranged substantially at equal 90° intervals around the circumference of a reference plane circle, and by the polyphase modulation means comprising means for modulating the four signals from the four wave receiving means with relative phases of substantially 0°, 90°, 180° and 270°.

6. A method for measuring the direction from which a wave signal is received relative to two independent angular coordinates including the steps of receiving the wave signal at at least three separate positions spaced generally around a reference axis, modulating at least three of the received signals with separate and known phases, combining the signals into a single combined signal, angle demodulating the combined signal, and measuring two independent parameters of the demodulated signal.

7. The method of claim 6 further characterized by the wave signal being an electromagnetic wave signal.

8. The method of claim 7 further characterized by the two measured independent parameters being the amplitudes of two independent phase components of the demodulated signal relative to the polyphase modulation.

9. The method of claim 7 further characterized by the two measured independent parameters being the amplitude and phase of the demodulated signal relative to the polyphase modulation.

References Cited

UNITED STATES PATENTS 2,449,553  9/1948  Hansel _____ 343—121

RODNEY D. BENNETT, *Primary Examiner.*

R. E. BERGER, *Assistant Examiner.*

U.S. Cl. X.R.

343—113